G. C. BECK.
FACIAL MASSAGE APPARATUS.
APPLICATION FILED JAN. 4, 1911.
1,007,636.
Patented Oct. 31, 1911.
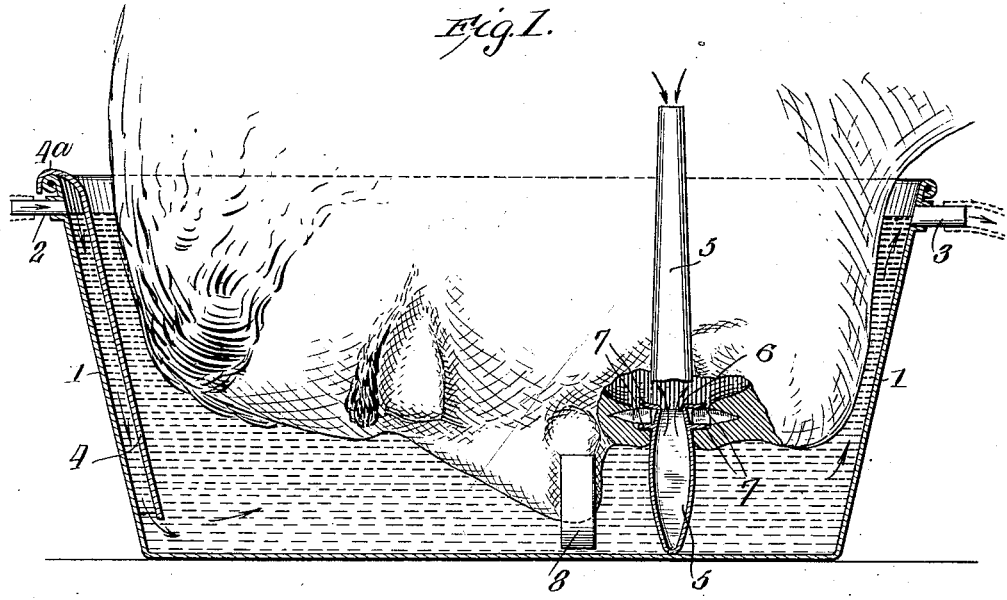
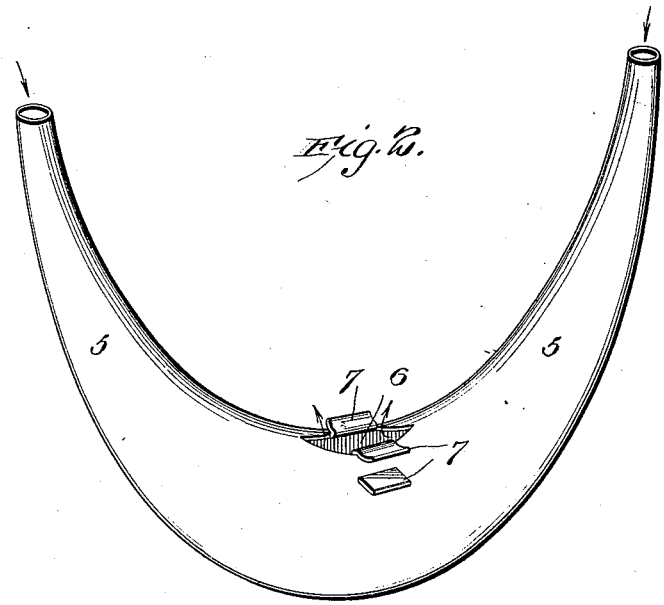
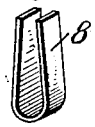
WITNESSES:
INVENTOR
GEORGE C. BECK
BY
ATTORNEYS

UNITED STATES PATENT OFFICE.

GEORGE C. BECK, OF SPOKANE, WASHINGTON.

FACIAL-MASSAGE APPARATUS.

1,007,636.  Specification of Letters Patent.  Patented Oct. 31, 1911.

Application filed January 4, 1911. Serial No. 600,693.

*To all whom it may concern:*

Be it known that I, GEORGE C. BECK, a citizen of the United States, and a resident of Spokane, in the county of Spokane and State of Washington, have invented certain Improvements in Facial-Massage Apparatus, of which the following is a specification.

My invention is an apparatus for use in applying hot water to the face, and constitutes an improved substitute for hot-towels which are commonly used for facial treatment.

The apparatus includes a water pan or open-top receptacle having attachments for inflow and outflow of hot water, and a device adapted to be held in the mouth for supplying air to support respiration while the face is held immersed in the water contained in the pan.

In the accompanying drawing Figure 1 illustrates the manner of using the apparatus, the water pan and respiratory device being shown in section. Fig. 2. is a perspective view of the respiratory device. Fig. 3 is a perspective view of a nose clamp employed in the massaging operation.

The pan or hot water receptacle 1 has sufficient depth to allow immersion of the face, as shown in Fig. 1, and is provided near the top, at opposite points, with an inflow pipe 2 and an outflow pipe 3, to which, in practice, flexible pipes will be attached, as shown by dotted lines, for conducting hot water to and from the pan.

In order to prevent hot water, upon its entrance into the pan, from coming into immediate contact with the face, a guard 4, preferably constructed of sheet metal, is arranged to cover the discharge end of the inflow pipe 2 and extend down into the pan to a point near the bottom thereof, its upper end being preferably constructed as a hook 4ª to adapt it for convenient suspension to, and detachment from, the pan. It will be understood that the guard 4 is curved transversely in cross section, thus forming a water-conduit with the adjacent portion of the pan. Instead of employing the parts 2, 3, and 4 in the manner indicated, the pan may be placed upon a stove or other heater, and thus the water may be raised to, and maintained at, the required temperature for the requisite length of time.

The respiratory device 5 is a hollow body in the form of a crescent, the same being preferably constructed of sheet steel and having open ends and also an opening 6 in the center of the inner side. On each side of said opening two laterally projecting lugs or flanges 7 are arranged, the members of each pair being separated by a narrow space but of a sufficient width to receive the incisor teeth of the party using the apparatus. The nose clamp 8 is constructed as a plate spring in U-form—see Fig. 3—and is applied as shown in Fig. 1.

In using the apparatus, the pan 1 being filled to the requisite depth with hot water, the same being allowed to flow through the pan as described, or raised to the required temperature by placing the pan on a heater, the face is immersed and held in the water, as shown in Fig. 1, the nose clamp 8 having been first applied and the respiratory device 5 arranged in the manner shown, the horns thereof extending up on the sides of the cheeks and the central portion held in the mouth, so that the air opening 6 is entirely covered, while the teeth enter the spaces between the lugs or flanges 7, as shown in Fig. 1, whereby the device is held in place without difficulty. The horns being of a sufficient length to project above the pan, it is apparent that respiration may proceed indefinitely or as long as it is required to hold the face in the hot water to secure the desired effect. By this means, the face may be treated without the necessity of frequently removing it from, and re-inserting it in, the water, as commonly practiced. It is to be understood that one of the horns of the respiratory device may be dispensed with, although the form shown is much to be preferred.

It is preferred to construct the device in crescent form, that is to say, with a greater diameter and capacity in its lower or middle portion, in order to adapt it to receive and hold water, if it should find entrance, by accident or the carelessness of the patient, between his lips and through the openings 6. There is, however, practically no danger that sufficient water can accumulate in this way in the device 5 to reach and obstruct the air-opening 6.

The apparatus is adapted for domestic or home use as well as for use by barbers and facial masseurs, and is a most effective and safe substitute for hot towels, by which skin diseases are sometimes communicated.

What I claim is:—

1. A respiratory device consisting of a hollow rigid body having an air opening and adjacent lugs or flanges adapted for engagement with the teeth of the patient, the body being curved upward therefrom and open at the outer end, substantially as described.

2. A respiratory device constructed as a rigid tubular body in crescent form and open at the outer ends, and provided centrally on the inner side with an air opening adapted to be covered by the mouth of the patient when the device is in use, and laterally projecting flanges arranged on opposite sides of the opening for engagement with the teeth of the patient, substantially as described.

3. The improved respiratory device formed of a hollow rigid body in curved form, the same having open ends, a central air opening on the inner side, and two pairs of flanges arranged adjacent to the opening on opposite sides of the same, the members of each pair being separated by a narrow space, for the purpose specified.

GEORGE C. BECK.

Witnesses:
MURRAY T. DAVENPORT,
HARRY W. OLNEY.

Copies of this patent may be obtained for five cents each, by addressing the "Commissioner of Patents, Washington, D. C."